United States Patent
Norling et al.

[11] Patent Number: 5,503,018
[45] Date of Patent: Apr. 2, 1996

[54] TUNNEL CURRENT SENSOR WITH FORCE RELIEF PROTECTION

[75] Inventors: Brian L. Norling, Mill Creek; James R. Woodruff, Redmond, both of Wash.

[73] Assignee: AlliedSignal Inc., Morris Township, N.J.

[21] Appl. No.: 987,947

[22] Filed: Dec. 8, 1992

[51] Int. Cl.$^6$ .................................................. G01P 15/08
[52] U.S. Cl. ........................................... 73/514.15; 73/1D
[58] Field of Search ............................. 73/577 R, 576, 73/517 B, 577 AV, 505, 1 D, 862.68, 862.59

[56] References Cited

U.S. PATENT DOCUMENTS

| | | | |
|---|---|---|---|
| 4,472,239 | 9/1984 | Johnson et al. | 156/648 |
| 4,507,170 | 3/1985 | Myhre | 156/633 |
| 4,614,119 | 9/1986 | Zavracky et al. | 73/704 |
| 4,638,669 | 1/1987 | Chou . | |
| 4,711,128 | 12/1987 | Boura | 73/517 B |
| 4,783,237 | 11/1988 | Aine et al. | 156/648 |
| 4,841,773 | 6/1989 | Stewart | 73/510 |
| 4,882,933 | 11/1989 | Petersen et al. | 73/517 R |
| 4,891,984 | 1/1990 | Fujii et al. | 73/517 R |
| 4,928,203 | 5/1990 | Swindal et al. | 73/517 AV |
| 4,996,877 | 3/1991 | Stewart et al. | 73/510 |
| 5,009,111 | 4/1991 | West et al. | 73/517 B |
| 5,048,339 | 9/1991 | Neuhaus | 73/1 D |
| 5,079,958 | 1/1992 | Takase et al. | 73/862.61 |
| 5,211,051 | 5/1993 | Kaiser et al. | 73/1 D |
| 5,265,470 | 11/1993 | Kaiser et al. | 73/763 |
| 5,285,686 | 2/1994 | Peters | 73/505 |

OTHER PUBLICATIONS

T. W. Kenny, et. al., "Electron Tunnel Sensor Technolgy", Pasadena, Calif., 1990, pp. 77–92.
T. W. Kenny, et. al., "A Micromachined Silicon Electron Tunneling Sensor", Napa Valley, Calif., 1990, pp. 192–196.
W. J. Kaiser, et. al., "Tunnel–Effect Displacement Senor", Pasadena, Calif., 1989, pp. i and 1–2.
S. B. Waltman, et. al., "An Electron Tunneling Senosr", Pasadena, Calif., 1989, pp. 1a–9a.
A. P. Pisano, "Resonant–Structure Micromotors", Berkeley, Calif., 1989, pp. 44–48.
W. C. Tang, et. al., "Laterally Driven Polysilicon Resonant Microstructures", Berkeley, Calif., 1989, pp. 53–59.

*Primary Examiner*—Hezron E. Williams
*Assistant Examiner*—Henlen C. Kwok
*Attorney, Agent, or Firm*—Howard G. Massung

[57] ABSTRACT

A tunnel current position sensor has a first sensing electrode coupled to a compliant beam for providing force relief to the sensor. The beam is connected in fixed relationship with a first object. A second sensing electrode is coupled to a second object. The compliant beam elastically deforms to prevent damage resulting from crashing of the electrodes.

5 Claims, 3 Drawing Sheets

TUNNEL CURRENT SENSOR WITH FORCE RELIEF PROTECTION

FIELD OF THE INVENTION

The present invention relates to micromachined sensor devices and, in particular, to a tunnel current sensor having force relief protection that can be used in devices such as micromechanical servo accelerometers, pressure sensors, etc.

BACKGROUND OF THE INVENTION

Recent advances in sensor technology have resulted in the use of tunnel current sensors for the detection of the relative placement of two objects. The Kenny et al article entitled "Electron Tunnel Sensor Technology", presented at the first national conference and exhibition of NASA's technology for transfer in November of 1990, describes a micromachined servo accelerometer that utilizes such a tunnel current sensor. The accelerometer is micromachined from silicon and includes a cantilever spring with an integral tip. A gold film is deposited over the tip to form a tunnel current electrode. A gold film is also deposited over the cantilever spring to form an electrostatic drive electrode. The inner rectangular area of the folded cantilever spring, here referred to as a proof mass, can be deflected relative to the outer segments, here referred to as a frame, by application of an electric potential between the drive electrode and a corresponding drive electrode disposed on another component of the accelerometer.

Once assembled, a bias voltage is applied to the electrostatic drive electrodes to close the electrodes and drive the proof mass to a servo null position at which a tunnel current having a predetermined value is established. Active regulation of the tip-electrode separation is carried out using feedback control.

Operation of the device as an accelerometer may be achieved in either of two ways. In the first approach, denoted as open loop, acceleration is measured at frequencies above the feedback loop bandwidth in accordance with a predetermined mathematical relationship. In the second approach, denoted as closed loop, acceleration is measured for all frequencies less than the feedback loop bandwidth. In this case, an acceleration displaces the proof mass. The displacement results in a corresponding change in the tunnel current from its predetermined value. A feedback loop responds to the change in the tunnel current by adjusting the voltage potential between the drive electrodes so as to return the proof mass to its servo null position. The variation in the voltage from its bias value is used to calculate the acceleration value since the acceleration value is a function of the voltage variation.

The drive electrodes of the accelerometer can only apply an attractive force which draws the electrodes toward one another. As a result the electrostatic drive can provide the required servo rebalance force only when the acceleration is in a direction which drives the electrodes apart from one another. When an acceleration is applied in the opposite direction in which the electrodes are driven toward one another, the voltage difference between the electrodes is decreased thereby decreasing the drive force. The flexures which connect the proof mass to the frame then provide an elastic force to return the proof mass to its servo null position. Without acceleration, the elastic force provided by the flexures must at least be equal to the rebalance force required to reposition the proof mass to its servo null position upon application of full scale acceleration. Likewise, the electrostatic drive must be capable of providing enough force to drive the proof mass to its servo null position upon application of full scale acceleration. To provide the necessary dynamic response, the forces which the electrostatic drive and the flexures are respectively capable of providing must exceed the minimum force required to reposition the proof mass to its servo null position upon application of full scale acceleration.

Because of the narrow gap separating the tunnel current electrodes, damage to the electrodes can occur from acceleration overloads or from sudden acceleration, for example shock loads, to which the servo system cannot adequately respond. Such loads may crash the tunnel current electrodes and break off, damage or otherwise deform them. In addition, damage to the sensing electrodes may occur from acceleration of the sensor when power is not applied to the system.

Since the tunnel current sensor is quite sensitive to separation between the electrodes, the sensor is extremely sensitive to even minor breakage or damage of the electrodes. Even if the electrodes continue to function, deformation of the sensing electrodes tends to alter the null position of the sensing device. In the case of a servo accelerometer, the servo system thereafter moves the proof mass to a new null position. This changes the force exerted by the suspension on the proof mass and thus alters the acceleration signal bias. Accordingly, such sensor devices are subject to variation or breakdown over time.

SUMMARY OF THE INVENTION

The present invention is directed to a tunnel current sensor that is utilized for detecting the relative position of first and second objects. The tunnel current sensor utilizes a force relief mechanism to assist in preventing damage to the sensing electrodes which may occur due to crashing of the sensing electrodes. In the present invention, a compliant beam is utilized as a force relief mechanism. The compliant beam has a first end in fixed relationship with the first object. A first sensing electrode is disposed on the compliant beam. A second sensing electrode is disposed on the second object. The compliant beam resiliently bends to assist in preventing damage to the sensing electrodes due to electrode crashing.

In one specific embodiment of the invention, the tunnel current sensor and associated force relief mechanism are utilized in a servo accelerometer. The accelerometer includes a proof mass suspended from a support frame by an elastic suspension. A compliant beam has one end connected in fixed relation with the support frame. A first tunnel current sensing electrode is disposed on the compliant beam and a second tunnel current sensing electrode is disposed on the proof mass. The compliant beam resiliently bends to prevent damage to the sensing electrodes due to electrode crashing that occurs when, for example, the accelerometer is subject to an overload condition or when the servo response time is inadequate.

In a further embodiment of the invention, the compliant beam extends over a stop member that is in substantially fixed alignment with the support frame. The stop member contacts the end of the compliant beam that is distal the end that is connected in fixed alignment with the support frame. The compliant beam is pre-stressed to urge the first sensing electrode toward the second sensing electrode and against the stop member. This configuration has an advantage in that the compliant beam does not move freely when the accelerometer is subject to normal acceleration loads. However, the forces due to the pre-stressed condition of the beam are small enough to allow the beam to resiliently bend when the accelerometer is subject to an acceleration overload.

In a still further embodiment, the compliant beam overhangs the support frame. An electrostatic drive electrode is disposed on the overhanging portion of the beam. Additionally, the second sensing electrode is disposed in a notch in the proof mass.

During operation of this embodiment, a voltage difference is applied between the drive electrode and the support frame to urge the compliant beam against the support frame and place the first sensing electrode into an operable position with respect to the second sensing electrode. The voltage difference is chosen such that the electrostatic force holding the beam against the support frame is large enough to hold the beam in its proper position during application of normal acceleration. However, the electrostatic force is small enough to allow the compliant beam to resiliently bend when the accelerometer is subject to an acceleration overload thereby preventing damage due to electrode crashing. Without power, the sensing electrodes are spaced from one another to prevent electrode crashing, for example, in shipment.

In yet another embodiment of the invention, a projection extends from the compliant beam. The projection urges the compliant beam away from the proof mass to prevent electrode crashing when the accelerometer is subject to an overload condition.

The present invention provides force relief for tunnel current position sensing electrodes to prevent damage to the sensing electrodes due to electrode crashing. Although the present invention is particularly suited for use in sensors such as micromachined servo accelerometers, it is likewise suitable for use in pressure sensors, inertial angular rate sensors, and other sensors utilizing tunnel current sensors to measure the relative position of two objects.

BRIEF DESCRIPTION OF THE DRAWINGS

The invention, together with the advantages thereof, may be understood more fully by reference to the following detailed description taken in conjunction with the accompanying drawings on which.

It will be understood, however, that the drawings are not necessarily to scale. In certain instances, details which are not necessary for understanding the present invention have been omitted for clarity.

DESCRIPTION OF THE PREFERRED EMBODIMENTS

Figure 1:
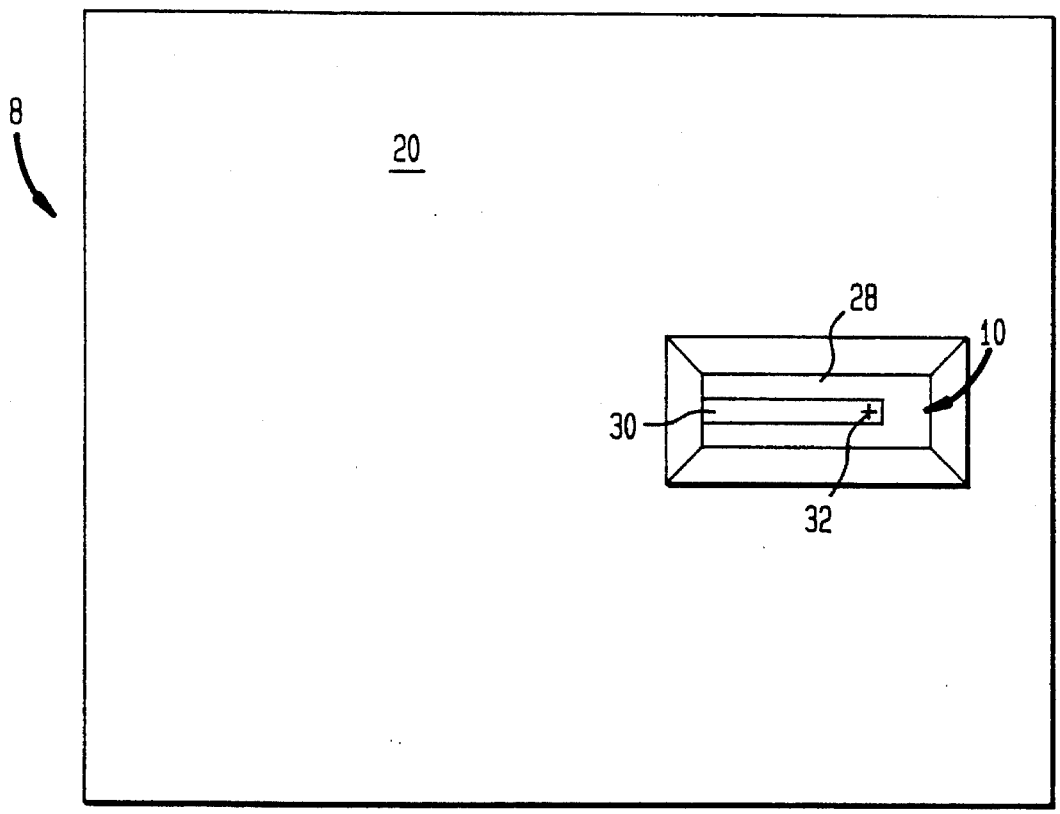
FIG. 1 is a plan view of an accelerometer including a tunnel sensing electrode suspended on a compliant beam in accordance with the present invention.
Figure 2:
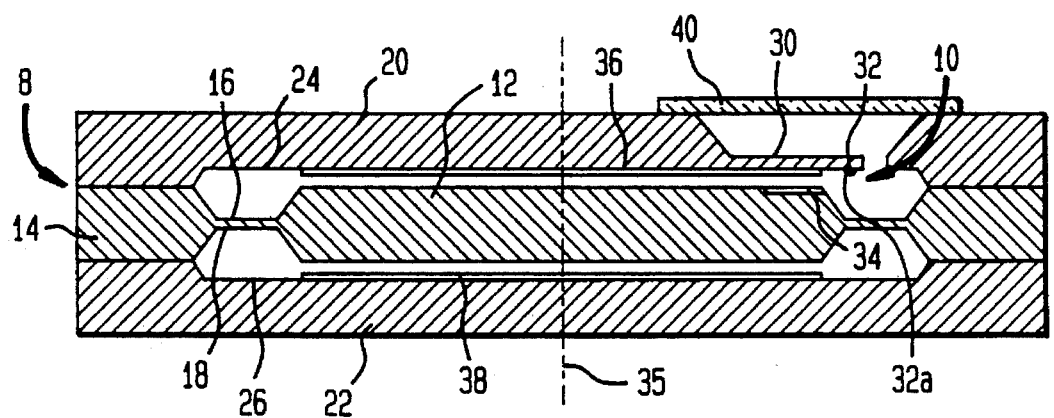
FIG. 2 is a cross sectional view of the accelerometer of FIG. 1.

FIGS. 1 and 2 show a servo accelerometer 8 which uses a tunnel current sensor 10 having force relief protection. The servo accelerometer 8 includes a proof mass 12 coupled to a support frame 14 with one or more flexures 16 (see FIG. 2). The flexures 16 provide a compliant suspension for the proof mass 12 and permit movement about a hinge axis 18. A pair of opposed cover plates 20 and 22 are bonded to the support frame 14. The upper cover plate 20 includes a surface 24 closely spaced from the proof mass 12. Similarly, the lower cover plate 22 includes a surface 26 closely spaced from the proof mass 12.

Further details of the structure of such an accelerometer are shown and described in U.S. Ser. No. 986,958, filed Dec. 8, 1992 and U.S. Pat. No. 5,361,635, issued Nov. 8, 1994 which are hereby incorporated by reference.

FIG. 2 shows the upper cover plate 20 in greater detail. The cover plate 20 includes an opening 28 formed therein. A thin compliant beam 30 is connected to the cover plate 20 and extends into the opening 28. The beam 30 is sufficiently compliant to be pushed into the cover plate opening 28 during an overload of the accelerometer. A top plate 40 is attached to the cover plate 20 to seal the opening 28.

FIGS. 1 and 2 also show the placement of the tunnel current sensor 10. The tunnel current sensor 10 includes a first tunnel current electrode 32 which is mounted to the compliant beam 30. The sensing electrode 32 is a pyramid-like structure having a base region connected to the face portion 24. The base region, is generally tapered and terminates at an apex 32a. A second tunnel current sensing electrode 34 is mounted to the proof mass 12. The sensing electrodes are maintained at a predetermined nominal spacing during normal operation of the servo accelerometer 8. This predetermined spacing is typically on the order of 5 Å. The sensing electrodes can be constructed as shown and described in U.S. Ser. No. 07/987,500, filed Dec. 8, 1992 which is hereby incorporated by reference.

The tunnel current sensor 10 operates when a potential is applied across the first and second sensing electrodes 32 and 34 and the electrodes are drawn sufficiently close to each other so that electrons from the first electrode 32 reach the second electrode 34. For this reason, the first sensing electrode 32 is often referred to as an electron emission electrode and the second sensing electrode 34 as a positive electrode. The electron penetration provides a tunnel current that is extremely sensitive to the separation to the first and second sensing electrodes 32 and 34. When the proof mass 12 is moved about hinge axis 18 upon the receipt of acceleration in the direction denoted by line 35, the change in the spacing between the first and second sensing electrodes 32 and 34, in conjunction with other circuitry not shown here, produces a position sensing signal.

FIG. 2 also shows multiple electrostatic drive surfaces of an electrostatic drive arrangement used to reposition the proof mass 12. The electrostatic drive arrangement includes a first conducting surface 36 attached to the upper cover plate 20. A second conducting surface 38 is located on the lower cover plate 22. The conducting surfaces are preferably closely spaced from the proof mass and receive drive voltage signals for providing restoring forces to the proof mass 12 to maintain the proof mass 12 in its servo null position.

In operation, the proof mass 12 rotates about the hinge axis 18 in response to a sensed acceleration. In an overload condition, the proof mass 12 rotates so that the positive electrode 34 contacts the electron emission electrode 32. However, the compliant beam 30 is pushed into opening 28 until the proof mass 12 abuts against the upper cover plate face portion 24. In this way, deformation or other damage to the electrodes 32 and 34 is avoided.

Figure 3:
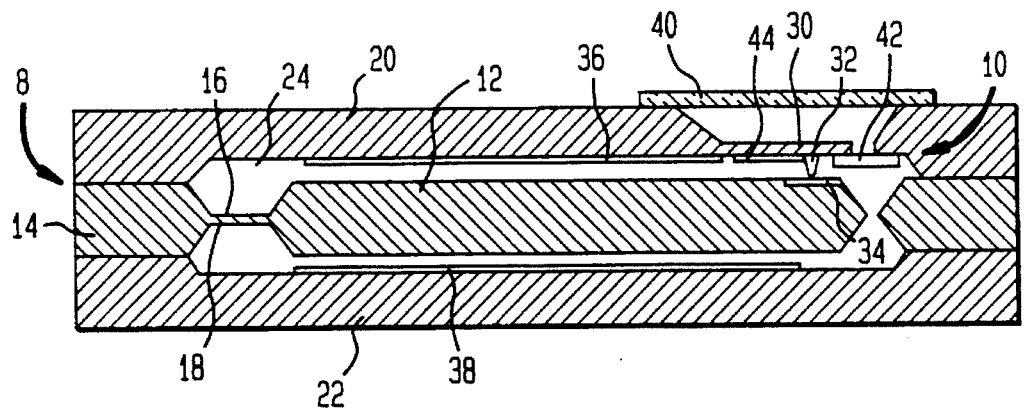
FIG. 3 is a cross sectional view of an accelerometer incorporating a force relief mechanism in accordance with a second embodiment of the invention.

FIG. 3 shows the electron emission electrode 32 suspended from a compliant beam 30 in another embodiment of the invention. In this embodiment, however, the beam 30 extends over a stop member 42 that is secured to the upper cover plate surface 24. The beam 30 is pre-stressed so that it normally applies a slight force against the stop member 42. The beam 30 may be pre-stressed, for example, by applying a silicon nitride layer 44 to the lower surface of the beam 30. This may be accomplished with a low pressure chemical vapor deposition applied to the lower surface of the compliant beam 30 as will be understood by those skilled in the art. As a result of this process, the silicon nitride layer 44 applies a tensile stress to the beam 30 and urges the beam 30 against the stop member 42.

The force created by the pre-stressed condition of the beam is created at a level such that the force advantageously prevents movement of the beam 30 when the accelerometer is subjected to a normal range of acceleration inputs. Accordingly, changes in the tunnel current position signal and interference in the operation of the servo loop are minimized. On the other hand, the force is small enough so that when the proof mass 12 receives an overload acceleration or shock, the proof mass displaces the compliant beam 30 away from the stop member 42, thereby preventing damage to the sensing electrodes 32 and 34.

Figure 4:
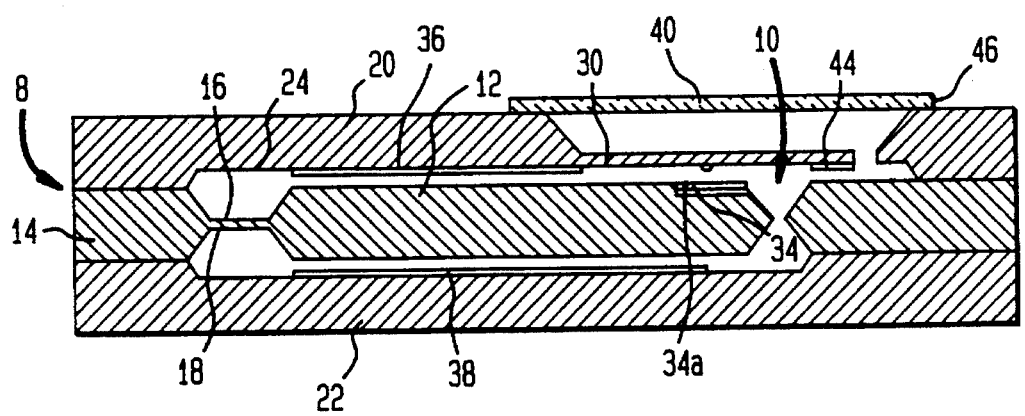
FIG. 4 is a cross sectional view of an accelerometer incorporating a force relief mechanism in accordance with a third embodiment of the present invention.

FIG. 4 illustrates a compliant beam 30 which is formed of a sufficient length to overhang at least a portion of the support frame 14. The beam 30 includes an electrostatic drive electrode 44 which is closely spaced from the support frame 14. In operation, a potential is applied between the electrode 44 and the support frame 14. The electrode 44 is attracted to and tends to adhere to the support frame surface 46, which is covered by an insulating layer of silicon dioxide. The electrostatic force attracting the electrode 44 to the support frame 14 is sufficient to hold the sensing electrode 32 in place when the accelerometer is subjected to a normal range of acceleration inputs. However, the electrostatic force does not resist bending when the accelerometer is subject to an overload acceleration. Rather, the beam is forced back into the recess so that the sensing electrodes 32 and 34 are not damaged.

In addition, the sensing electrode 34 is placed within a notch 34a formed in the proof mass 12. In an inoperable mode, when a voltage potential is not applied between the electrode 44 and support frame, the proof mass 12 is stopped by the cover plate surface 24 before the tunnel current electrodes 32 and 34 touch. Alternatively, the sensing electrode 32 may be set within a notch formed in the compliant beam 30 for the same purpose.

Figure 5:
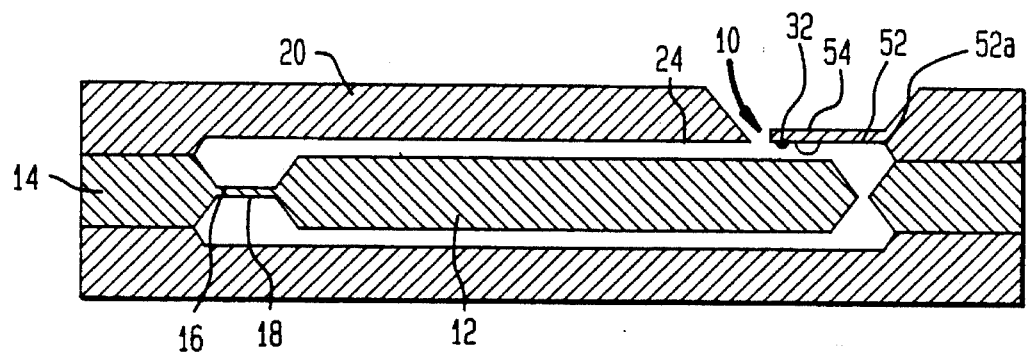
FIG. 5 is a cross-sectional view of an accelerometer incorporating a force relief mechanism in accordance with a fourth embodiment of the present invention.
Figure 6:
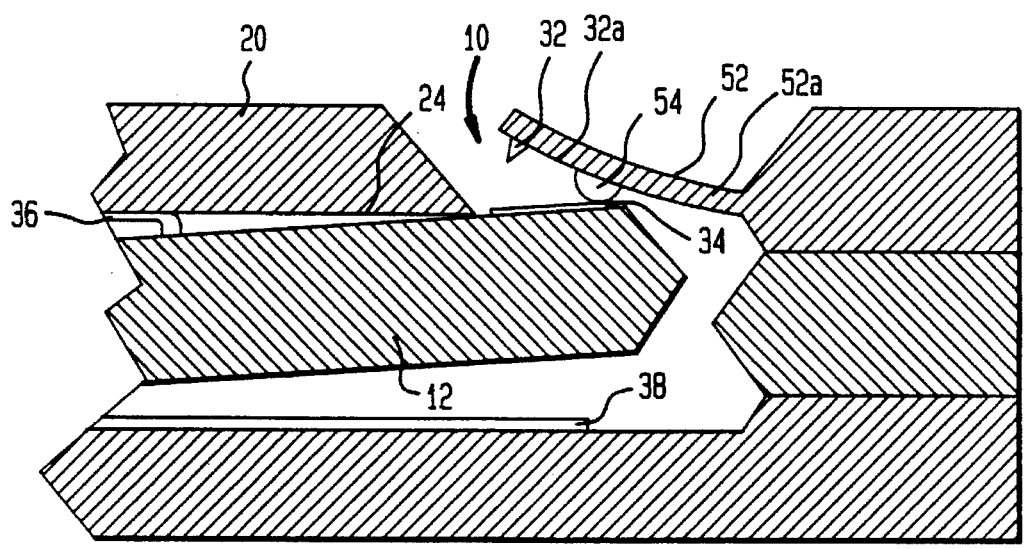
FIG. 6 is a cross-sectional view of the embodiment shown in FIG. 5 in an overload condition.

FIGS. 5 and 6 show a sensor 10 suspended from a compliant beam 52 in normal and overload modes of operation. FIG. 5 shows the configuration in a normal mode of operation. The compliant beam 52 extends from cover plate 20 and has a point of connection 52a with the cover plate 20 opposite the hinge axis 18. The emission electrode 32 is secured to the compliant beam 52 opposite the beam point of connection 52a. In addition, a projection 54 extends from the beam 52 and is disposed between the emission electrode 32 and the point of connection 52a.

FIG. 6 shows the accelerometer 8 in an overload condition. In this condition, the proof mass 12 engages the projection 54 which urges the beam 52 and emission electrode 32 away from the proof mass 12. The proof mass is then constrained from further movement by engagement with the cover plate surface 24. While the proof mass may initially engage the tip 34a of the emission electrode 32 slightly, the projection 54 starts to carry the load before a damaging load is exerted on the electrode tip. With additional deflection, the emission electrode 32 is eventually disengaged from the positive electrode 34 and the entire load is carried by the projection. However, with the electrodes 32,34 disengaged, there is no longer a tunnel current and, therefore, no sensing signal supplied to the servo electronics. This may cause a latch up condition. To prevent this latch up condition, the projection may be designed to carry current, i.e., through a metallization layer, to give proper feedback information to the servo electronics. The feedback information would indicate to the servo electronics that the electrodes 32,34 are disengaged due to an overload condition. Once the servo electronics then determine that the lack of a sensing signal is due to an overload condition, the necessary adjustments may be automatically made to preclude a latch up condition. For example, the projection and electrode 32 may be connected to the same conductive path. When the electrode 32 disengages from the positive electrode 34, there is no longer a tunnel current flowing therebetween. However, since the projection is connected to the same path as the emission electrode 32, a current flows between electrode 34 and the projection. Since this current will be larger than the tunnel current that flows in the servo null position, the servo system will drive the proof mass to attempt to disengage the electrodes 32,34. Once the proof mass is driven to the point at which the projection disengages from electrode 34, the tunnel current is once again the basis for controlling the separation of the electrodes.

While several embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventors to embrace herein all changes which come within the meaning and range of equivalency of the claims.

What is claimed is:

1. A tunnel current sensor for sensing the position of a first object with respect to a second object, comprising:

a compliant beam having a first end affixed to the first object and a second end distal said first end, said first and second objects being in spaced relation;

an electron emission electrode disposed on said compliant beam;

a positive electrode disposed on the second object;

said electron emission and positive electrodes being displaced toward each other to position the first and second objects upon an electrical potential being applied across said electrodes; and said compliant beam being effective as force relief means, whereby bending of said beam in response to external forces caused by overloading conditions on said sensor relieves said external forces for preventing damage to said electrodes due to electrode crashing.

2. An accelerometer comprising:

a support frame;

a proof mass elastically suspended form said support frame;

a compliant beam having a first end affixed to said support frame and a second end distal said first end;

a tunnel current electron emission electrode disposed on said compliant beam;

a tunnel current positive electrode disposed on said proof mass;

said electron emission and positive electrodes being displaced toward each other to position the support frame and proof mass upon an electrical potential being applied across said electrodes; and said compliant beam being effective as force relief means, whereby bending of said beam in response to external forces caused by overloading conditions on said accelerometer relieves said external forces for preventing damage to said electrodes due to electrode crashing.

3. An accelerometer as claimed in claim 2 and further comprising a cover plate connected to said support frame, said first end of said compliant beam being connected to said cover plate.

4. An accelerometer as claimed in claim 3 wherein said cover plate includes a recess into which said compliant beam is urged by said proof mass.

5. An accelerometer, comprising:

a support frame;

a proof mass elastically suspended from said support frame;

a cover plate connected to said support frame, said cover plate having a recess;

a compliant beam extending from said cover plate and into said recess;

a tunnel current electron emission electrode disposed on said compliant beam;

a tunnel current positive electrode disposed on said proof mass;

said electron emission and positive electrodes being displaced toward each other to position the support frame and proof mass upon an electrical potential being applied across said electrodes; and said compliant beam being effective as force relief means, whereby bending of said beam in response to external forces caused by overloading conditions on said accelerometer relieves said external forces for preventing damage to said electrodes due to electrode crashing.

* * * * *